United States Patent [19]
Desmarais

[11] Patent Number: 4,501,617
[45] Date of Patent: Feb. 26, 1985

[54] TILE MORTARS

[75] Inventor: Armand J. Desmarais, Wilmington, Del.

[73] Assignee: Hercules Incorporated, Wilmington, Del.

[21] Appl. No.: 574,228

[22] Filed: Jan. 26, 1984

Related U.S. Application Data

[63] Continuation-in-part of Ser. No. 462,507, Jan. 31, 1983, abandoned.

[51] Int. Cl.³ .............................................. C04B 7/353
[52] U.S. Cl. ....................................... 106/93; 106/314
[58] Field of Search ............................ 106/90, 314, 93

[56] References Cited

U.S. PATENT DOCUMENTS 3,215,549 11/1965 Ericson ................................. 106/93
4,402,752 9/1983 Chesney ................................ 106/93

Primary Examiner—James Poer
Attorney, Agent, or Firm—Joanne L. Horn

[57] ABSTRACT

Improvements in ceramic wall and floor tile mortars are effected by incorporating therein at least one hydroxypropylhydroxyethylcellulose having specified substitution levels as a water retention aid or thickener.

12 Claims, No Drawings

TILE MORTARS

This application is a continuation-in-part of the application Ser. No. 462,507, filed Jan. 31, 1983, for Tile Mortars, now abandoned.

This invention relates to novel compositions useful as mortar for the installation of ceramic wall and floor tiles. More specifically, it relates to such a composition containing a novel water-retention agent.

Conventional ceramic tile cements are mixtures of cement, sand, and thickener. Usually, they also contain small amounts of polyacrylamide and polyvinyl alcohol to improve performance. The dry cement mixture is then mixed with water to form a mortar.

The physical characteristics of a cured conventional mortar are determined by the rate of curing, and thus, by the rate of water removal therefrom during the curing operation. Any influence which affects these parameters by increasing the rate of water removal or by diminishing the water concentration in the mortar at the onset of the curing reaction can cause a deterioration of the physical properties of the mortar. Most ceramic wall tiles, on their unglazed surfaces, are highly porous and, when set on such a mortar, absorbs water therefrom, leading to the difficulties just mentioned. Likewise, most strata to which these tiles are applied such as wallboard, cinderblock, or masonry, are also porous and lead to the same problems.

To overcome, or at least minimize, the above-mentioned water-loss problems, it has been suggested to add to the mortar compositions a small amount of a water-soluble polymer, such as, methylcellulose (U.S. Pat. No. 2,934,932); hydroxyethylcellulose (U.S. Pat. No. 3,243,307); or phenyl hydroxyethylcellulose, benzyl hydroxyethylcellulose or ethyl hydroxyethylcellulose (U.S. Pat. No. 4,065,319) as a water retention aid. These polymers prevent escape of the water from the cement by increasing the viscosity of the water phase, thus, maintaining the desired water concentration in the mortar during curing.

In accordance with this invention, it has been found that improved tile mortar can be prepared if at least one modified hydroxyethylcellulose containing specific amounts of an additional substituent group is employed as the thickener or water retention aid. Specifically, the modified hydroxyethylcellulose is one having hydroxypropyl substitution in addition to the hydroxyethyl group. More specifically, the hydroxyethylcellulose is one having hydroxyethyl substitution from about 0.3 to about 4.0 M.S. and hydroxypropyl substitution greater than 0.35 M.S., preferably greater than 0.6 M.S. Most preferably, the hydroxyethyl M.S. will be from about 0.8 to 1.8, and the hydroxypropyl M.S. will be from about 0.8 to about 1.5. More than 0.35 hydroxypropyl M.S. is required to lower the set time of the mortar to the desired level.

The designation M.S. refers to the average number of moles of hydroxyethyl or hydroxypropyl substituent groups combined per cellulosic anhydroglucose unit.

Typically from about 0.3% to about 4% of the modified hydroxyethylcellulose or of blends thereof is used.

When compared with the mortars prepared with conventional hydroxyethylcelluloses as the water retention agent, the mortars of this invention are improved in texture, set times, and adjustability times, which are three important parameters used widely in the art to characterize tile mortars. They also show improvement in tack and cohesiveness.

Set time is defined in ASTM C266-65. Basically set time is the time the mortar takes to set or harden at a given thickness. Adjustability time is the time during which the position of the tile on the wall can be changed without the tile coming loose from the mortar.

The modified hydroxyethylcellulose which can be used as thickener in the mortars of this invention is prepared by reacting ethylene oxide and propylene oxide with cellulose in a strongly alkaline medium. Specific techniques for carrying out the etherification are well known in the art and any known procedure can be employed.

In the alternative, a hydroxyethycellulose can be etherified with a propylene oxide in a strongly alkaline medium. In this case, the hydroxyethylcellulose can be substantially any grade having M.S. from about 0.3 to about 4.0. The preferred materials are those having a viscosity from about 800 to about 5000 centipoise in a 1% water solution. Materials of higher and lower viscosity can also be used advantageously, however.

A tile mortar based on Portland cement or other hydraulic cements can be prepared containing only the hydraulic cement and the water retention aid of the instant invention. Normally, however, most formulations will include a rather substantial amount of sand.

The amount of hydraulic cement can be a high as 99.4% in the case of a mortar containing only hydraulic cement and the modified hydroxyethylcellulose to as little as about 24% of the hydraulic cement in the case of mortars containing sand and other components. Sand, if used, should be present in the amount of from one to three volumes of sand per volume of hydraulic cement. For setting porous tiles, a mixture containing equal volumes of hydraulic cement and sand up to one volume of hydraulic cement per 1½ volumes of sand produces a mortar which is entirely satisfactory.

The dry mortar composition may also contain finely divided inorganic or organic fibers, such as, for example, mineral wool, glass fibers, fibrous (low substitution or crosslinked) carboxymethylcellulose, and the like, in amount of from about 1% to about 2%. The incorporation of the fibers improves the thixotropic properties of the mortar, i.e., the use of fibers prevents sag of the mortar. Using a mortar containing fibers to bond ceramic tile to a vertical wall lessens the tendency of the tile to slip down the wall during setting of the mortar. More commonly, a small amount of polyacrylamide or of an anionic or cationic copolymer of acrylamide, i.e., about 1% based by weight on the thickener, is used to improve sag resistance. Polyvinyl alcohol in small amount, from about 0.05% to about 2%, based on the weight of the hydraulic cement, is frequently included to increase wet adhesion and attain better workability.

Thus, the hydraulic cement dry mixture of this invention consists essentially of from about 24% to about 99.4% hydraulic cement; from about 0.3% to about 4% of the modified hydroxyethylcellulose or of blends thereof; and from about 0% to about 75% sand.

This dry mixture, when added to water, forms a thin-set mortar, i.e., a mortar which can be used in thin layers on the order of ⅛ to ¼ inch. The amount of water used is such that the resultant mixture will not be so thin as to slide down a wall or drop off a ceiling when applied. In general, from about 25% to about 50% water, by weight based on the weight of the dry mixture, gives good results.

In the examples which follow, various embodiments of the mortar compositions of this invention are illustrated. In Examples 1 through 11, the formulation shown in Table I is employed except that a hydroxypropylhydroxyethylcellulose having the hydroxyehyl M.S. and the hydroxylpropyl M.S. shown in Table II for the particular example in question is used as the thickener.

TABLE I

| Components | Parts by weight |
|---|---|
| White Portland cement | 48.89 |
| Fine sand | 50.3 |
| Polyacrylamide | 0.01 |
| Thickener | 0.6 |
| Polyvinyl alcohol | 0.2 |
| Water | 26.0* |

*By weight of the dry component mixture.

The mortar compositions of this invention are prepared by dry mixing the first five components of Table I to a substantially homogeneous state, adding the dry mix to the water, and manually stirring to obtain a trowelable mix with complete and visually uniform wetting of the dry components. The wet mass is slaked for 30 minutes (except for that portion to be used in the set time test which is slaked for only 10 minutes), then remixed thoroughly before any evaluations are carried out.

A portion of the mortar is troweled onto the vertical surface of a dry cinderblock between guide strips ¼ inch thick. A Type B (floor) ceramic tile is lightly tapped onto the mortar surface immediately after application to the cinderblock with the back ribs of the tiles in vertical alignment. The position of the top edge of the tile is marked. Sag is the downward displacement of the tile measured 2 hours after placement on the mortar surface.

After another hour of slaking the mortar is troweled at room temperature and about 50% relative humidity (R.H.) onto a section of gypsum wallboard and 10 Type A (wall) ceramic tiles are pressed onto the mortar leaving 1/16 inch spacing between the tiles and wallboard. At 5-minute intervals at room temperature, a tile is twisted through a 90° angle back to its original position. Adjustability time is the longest time at which a tile remains affixed to the mortar when tested in this manner. The characteristics of the cement are shown in Table II.

Set time is the time mortar applied to a ceramic tile at a given thickness takes to set or harden as measured by a Gilmore needle according to the procedures of ASTM C266-65.

Consistancy, tack, and cohesiveness are subjective tests which measure trowelability, how well the mortar sticks to a metal spatula or trowel, and the overall integrity of the mortar composition, respectively.

TABLE II

Properties of Tile Cements Modified with Hydroxypropylhydroxyethylcellulose (HPHEC)

| Example No. | HPHEC HE M.S. | HPHEC HP M.S. | Adjustability (min.) | Sag (in.) | Set Time (hrs.) (Final) | Consistency (1) | Tack (1) | Cohesiveness (1) |
|---|---|---|---|---|---|---|---|---|
| Control | 2.48 | — | 25 | <1/16 | 11 | F | P | F |
| 1 | 0.8 | 1.4 | 55 | <1/16 | 12 | E | G | G |
| 2 | 0.82 | 0.68 | 30 | ⅛ | 10.5 | F | G | G |
| 3 | 0.86 | 0.48 | 25 | ⅛ | 10 | F | F | G |
| 4 | 0.93 | 1.17 | 60 | <1/16 | 12 | E | G | G |
| 5 | 1.31 | 1.08 | 50 | <1/16 | 11.5 | G | E | E |
| 6 | 1.4 | 1.411 | 65 | <1/16 | 12 | E | E | E |
| 7 | 1.47 | 0.74 | 30 | ⅛ | 10 | G | G | G |
| 8 | 1.51 | 1.1 | 50 | <1/16 | 12 | E | G | E |
| 9 | 1.6 | 1.2 | 60 | <1/16 | 12 | E | E | E |
| 10 | 1.70 | 0.55 | 25 | ⅛ | 10 | F | F | F |
| 11 | 1.77 | 0.83 | 40 | ⅛ | 11 | G | G | G |

(1) E = excellent; G = good; F = fair; P = poor; VP = very poor

In Examples 12 through 15 the formulation of Table I is used except that blends of hydroxypropylhydroxyethylcelluloses having the hydroxypropyl and the hydroxyethyl M.S. shown in Table III are used. The properties of the compositions of Examples 12 through 15 are also shown in Table III.

TABLE III

Properties of Tile Cements Modified with Hydroxypropylhydroxyethylcellulose (HPHEC)

| Example No. | HPHEC #1 HE M.S. | HPHEC #1 HP M.S. | HPHEC #2 HE M.S. | HPHEC #2 HP M.S. | Parts by Weight #1 | Parts by Weight #2 | Adjustability (min.) | Sag (in.) | Set Time (hrs.) (Final) | Consistency (1) | Tack (1) | Cohesiveness (1) |
|---|---|---|---|---|---|---|---|---|---|---|---|---|
| 12 | 1.25 | 0.99 | 0.43 | 0.36 | 0.36 | 0.24 | 60 | <1/16 | 12 | E | E | E |
| 13 | 0.95 | 0.94 | 0.49 | 0.54 | 0.42 | 0.18 | 60 | <1/16 | 12 | E | E | E |
| 14 | 1.25 | 0.99 | 0.56 | 0.60 | 0.30 | 0.30 | 60 | <1/16 | 12 | E | E | E |
| 15 | 1.25 | 0.99 | 0.36 | 0.36 | 0.42 | 0.18 | 60 | <1/16 | 12 | E | E | E |

(1) E = excellent; G = good; F = fair; P = poor; VP = very poor

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim and desire to protect by Letters Patent is:

1. In a dry mortar-forming composition having, by weight, from about 24% to about 99.4% of hyraulic cement; from about 0% to about 75% sand; and from 0.3% to about 4% of a water-retaining thickener, said dry composition being capable, when mixed with from about 25% to about 40% of its own weight of water, of producing a mortar which can be applied in thin layers for setting tile on walls and ceilings, wherein the improvement consists essentially of using as the water-retaining thickener at least one modified hydroxyethyl cellulose having a hydroxyethyl M.S. from about 0.3 to about 4.0 and a hydroxypropyl M.S. greater than 0.35.

2. In a dry mortar-forming composition having, by weight, from about 24% to about 99.4% of hydraulic cement; from about 0% to about 75% sand; about 1%, by weight of the thickener, of a polymer selected from the group consisting of polyacrylamide and anionic or cationic copolymers of acrylamide; and from 0.3% to about 4% of a water-retaining thickener, said dry composition being capable, when mixed with from about 25% to about 40% of its own weight of water, of producing a mortar which can be applied in thin layers for setting tile on walls and ceilings, wherein the improvement consists essentially of using as the water-retaining thickener at least one modified hydroxyethyl cellulose having a hydroxyethyl M.S. from about 0.3 to about 4.0 and a hydroxypropyl M.S. greater than 0.35.

3. In a dry mortar-forming composition having, by weight, from about 24% to about 99.4% of hydraulic cement; from about 0% to about 75% sand; from about 0.05% to about 2%, by weight of the hydraulic cement, of a polyvinyl alcohol; and from 0.3% to about 4% of a water-retaining thickener, said dry composition being capable, when mixed with from about 25% to about 40% of its own weight of water, of producing a mortar which can be applied in thin layers for setting tile on walls and ceilings, wherein the improvement consists essentially of using as the water-retaining thickener at least one modified hydroxyethyl cellulose having a hydroxyethyl M.S. from about 0.3 to about 4.0 and a hydroxypropyl M.S. greater than 0.35.

4. The composition of claim 1 wherein the water-retaining thickener is a blend of at least two modified hydroxyethyl celluloses.

5. The composition of claim 2 wherein the modified hydroxyethyl cellulose has a hydroxypropyl M.S. greater than 0.6.

6. The composition of claim 3 wherein the modified hydroxyethyl cellulose has a hydroxypropyl M.S. greater than 0.6.

7. The composition of claim 2 wherein the water-retaining thickener is a blend of at least two modified hydroxyethyl celluloses.

8. The composition of claim 3 wherein the water-retaining thickener is a blend of at least two modified hydroxyethyl celluloses.

9. The composition of claim 2 wherein the modified hydroxyethyl cellulose has a hyroxyethyl M.S. from about 0.8 to about 1.8 and a hydroxypropyl M.S. from about 0.8 to about 1.5.

10. The composition of claim 3 wherein the modified hydroxyethyl cellulose has a hydroxyethyl M.S. from about 0.8 to about 1.8 and a hydroxypropyl M.S. from about 0.8 to about 1.5.

11. The composition of claim 1 wherein the modified hydroxyethyl cellulose has a hydroxypropyl M.S. greater than 0.6.

12. The composition of claim 1 wherein the modified hydroxyethyl cellulose has a hydroxyethyl M.S. from about 0.8 to about 1.8 and a hydroxypropyl M.S. from about 0.8 to about 1.5.

* * * * *